United States Patent
Zhuang et al.

(10) Patent No.: US 11,251,452 B2
(45) Date of Patent: Feb. 15, 2022

(54) METHOD OF RESTORING ELECTROLYTE OF VANADIUM REDOX FLOW BATTERY THROUGH ELECTROLYSIS

(71) Applicant: Institute of Nuclear Energy Research, Atomic Energy Council, Executive Yuan, R.O.C., Taoyuan (TW)

(72) Inventors: Yu-De Zhuang, Taoyuan (TW); Chien-Hong Lin, Taoyuan (TW); Yi-Hsin Hu, Taoyuan (TW); Han-Wen Chou, Taoyuan (TW); Hwa-Jou Wei, Taoyuan (TW); Ning-Yih Hsu, Taoyuan (TW)

(73) Assignee: Institute of Nuclear Energy Research, Atomic Energy Council, Executive Yuan, R.O.C., Taoyuan (TW)

( * ) Notice: Subject to any disclaimer, the term of this patent is extended or adjusted under 35 U.S.C. 154(b) by 246 days.

(21) Appl. No.: 16/737,553

(22) Filed: Jan. 8, 2020

(65) Prior Publication Data
US 2021/0210778 A1    Jul. 8, 2021

(51) Int. Cl.
*H01M 8/06* (2016.01)
*H01M 8/04791* (2016.01)
*H01M 8/0444* (2016.01)
*H01M 8/18* (2006.01)

(52) U.S. Cl.
CPC ....... *H01M 8/0693* (2013.01); *H01M 8/0482* (2013.01); *H01M 8/04477* (2013.01); *H01M 8/188* (2013.01)

(58) Field of Classification Search
CPC ........... H01M 8/0693; H01M 8/04477; H01M 8/0482; H01M 8/188
See application file for complete search history.

(56) References Cited

U.S. PATENT DOCUMENTS

| | | | | |
|---|---|---|---|---|
| 2014/0363747 A1* | 12/2014 | Evans | ................. | H01M 8/0693 429/409 |
| 2015/0056525 A1* | 2/2015 | Lee | ....................... | H01M 8/188 429/409 |
| 2015/0104724 A1* | 4/2015 | Chang | .................... | H01M 8/188 429/418 |
| 2015/0303504 A1* | 10/2015 | Li | ..................... | H01M 8/04455 429/409 |

(Continued)

FOREIGN PATENT DOCUMENTS

CN    106198453 A    * 12/2016

*Primary Examiner* — Amanda C. Walke
(74) *Attorney, Agent, or Firm* — Demian K. Jackson; Jackson IPG PLLC (57) ABSTRACT

A method is provided for restoring an electrolyte of vanadium (V) redox flow battery (VRFB). Electrolyte data of an original system are analyzed in advance. A reusable positive electrode is further equipped with a V electrolyte. A reductant for a stack of VRFB is used in coordination as an electrolysis device. After a long-term reaction with a VRFB having a high valence (greater than 3.5), an electrolyte at the positive electrode is directed out to a negative electrode of the electrolysis device; and, then, electrolysis is processed after accurate calculation. In the end, the internal fluid balancing method of the original system is combined. Thus, a harmless and quick valence restoration is processed for the electrolyte of the original system, which is a final resort for the restoration of V electrolyte.

8 Claims, 7 Drawing Sheets

(56) References Cited

U.S. PATENT DOCUMENTS

| | | | | |
|---|---|---|---|---|
| 2016/0111744 | A1* | 4/2016 | Harrer | H01M 8/18 |
| | | | | 429/409 |
| 2016/0293992 | A1* | 10/2016 | Song | H01M 8/0693 |
| 2016/0372777 | A1* | 12/2016 | Buckley | H01M 8/188 |
| 2018/0019492 | A1* | 1/2018 | Kovacs | C25B 1/00 |
| 2018/0102561 | A1* | 4/2018 | Sullivan | H01M 8/0693 |

* cited by examiner

METHOD OF RESTORING ELECTROLYTE OF VANADIUM REDOX FLOW BATTERY THROUGH ELECTROLYSIS

TECHNICAL FIELD OF THE INVENTION

The present invention relates to restoring an electrolyte; more particularly, to processing electrolysis accompanied with separation without using any chemical reducing agent to the original system or causing other possible interference, like leaving residues, on the performance of electrolyte, where the valence of vanadium (V) electrolyte is restored through electrolysis.

DESCRIPTION OF THE RELATED ARTS

Vanadium redox flow battery (VRFB) is an electrochemical battery, whose features include voltage sustaining, deep charging and discharging, recyclability, long life, and ease of maintenance. Its manufacture, use, and the product obtained from disposal processes can be completely recycled. Hence, it is an ideal option for energy storage.

Yet, the permanent increase in valence is a key problem to be solved as a technical drawback of the all-vanadium(V) flow battery (all-VRFB). For running the system, highly acidic V electrolyte is used. After a long term of use, the reduced material contained in the V electrolytic at a negative electrode is inevitably reacted with hydrogen ions in the system, which leads to irreversible hydrogen production with the increase of the total valence of the V electrolyte of the system and, ultimately, leads to irreversible loss of capacity and system failure.

As regard to the phenomenon, the loss of capacity can be found in the system after a long term of use, which is mostly due to unbalanced electrolyte concentrations and valences (Owing to the problem of the use of a cation separator in the modern technology, 100 percent perfect selectivity can not be achieved, so that the positive and negative ions produce equivalent diffusion.) A common solution is to use the mechanism of self-balancing or quantified mixing of the electrolyte of the system. After the balancing, since the positive and negative electrodes are restored to form a temporary balance, it seems that the electrolyte returns back to its initial state with a short-term effect of capacity recovered.

However, after the V electrolyte in the system is operated with a plurality of times of the balancing, due to the aforementioned natural phenomena of Hydrogen production, the valence of the electrolyte cannot really return to the original state and would only continue to rise. Besides, because the life of V electrolyte comes from the total valence, the life issue appears where the previous balance would be gradually lost. No matter how the self balancing within the system is run, what is achieved after all is to slow down the speed of valence increase only. A single system only is hard to really achieve the goal of sustainable use of an energy storage system.

The treatment of invalid V electrolyte is mostly handled by waste recycling vendors for V ore refining. The products can be used in steel alloys, petrochemical catalysts, or other end-applications with no final waste generated while conforming to the spirit and concept of environmental protection. Yet, for really achieving sustainable operation of VRFB or running it for more than 20 years, the method aimed at restoring the total valence of the electrolyte has to be fully developed.

A few common and conventional patents for restoring V electrolyte are disclosed, one of which is the means of chemical redox where, after detecting the valence of V ion, the electrolyte is added with an amount of organic or inorganic oxidizing or reducing agent through actuarial calculation for mixing and reacting with V electrolyte to adjust the V electrolyte to a desired valence before use. Besides, a prior art reveals a connection to an external device so that the electrolyte valence of a flow battery of any element is ready to be restored by balancing whenever the electrolyte imbalance reaches a certain degree.

Although the above methods can achieve substantial effect of capacity restoration, residual additives may be left as resulting in poor detection or control and interfering the composition of V electrolyte. In the long run, the effectiveness of V electrolyte may be affected and the performance of the electrolyte may be lowered.

Another kind of methods for restoring the valence of electrolyte of VRFB are found in electrolyte production, where extracted V ore (vanadium pentoxide, etc.) is obtained as a raw material for restoration. A well-fabricated pentavalent V solution is obtained as a reducing agent to be added (a part of listed reducing agents are highly toxic, such as hydrazine compounds, etc.) After reducing the valence to be tetravalent, electrolysis is processed. The negative electrode generates a trivalent V electrolyte and the positive electrode, a pentavalent one. A reducing agent is obtained to make a tetravalent electrolyte again for completing the fabrication of V electrolyte at the positive and negative electrodes. But this method must have good stringent control for ensuring product quality, while the processes of restoration and fabrication cannot prevent the problem of residual solution. For an online system, using a similar method for restoring a V electrolyte is not quite different from buying a new electrolyte, which is of no benefit.

A method for restoring the valence of an electrolyte as the main purpose is revealed, which controls a partial hydrogen pressure for reducing the valence of V electrolyte. However, this method requires a dangerous use of hydrogen reacted under a high pressure, whose practice would be difficult. Another prior art is revealed with the purpose of reusing recycled waste. After a reducing agent is taken to contact the waste of V electrolyte, a treatment technology using an electrolysis method is processed to obtain a regenerated V electrolyte. But the problems of the residual reducing agent and the changed volume and concentration still remain.

Among the methods for fabricating V electrolyte through electrolysis, a method is revealed by combining an electrochemical method and a chemical reducing method. Through separating the positive and the negative electrodes, only a pollution-free concept of negative-electrode product is used to achieve a continuous production of V electrolyte. Yet, after each operation with this method, the positive electrode must be added with strong and toxic hydrazine hydrate (a reducing agent) for reaction during a shutdown time. A great amount of heat and gas are generated in processes and a next batch of reactions are carried out after finishing a previous batch of reactions accordingly. Although suitable for batch and fixed production of 3.5-valence V electrolyte, it is hard to practically achieve immediate application of continuous operations or a separating-restoration system. It does not meet the requirement of accurate valence restoration neither is suitable for the V electrolyte in the system after a long-term operation. Besides, this prior art uses a toxic reducing agent, so that it is adverse to be equipped to a V electrolyte restoration system for mobile business.

Other possible similar prior arts, like V extraction from spent electrolyte, V extraction from waste, etc., are mainly for recycling V metal only.

Documents concerning valence restoration of V electrolyte of VRFN are mostly related to equivalent restoration through volume balancing, which are passive mixture adjustments. (Document 1: Zhang, Yunong et al. "The Benefits and Limitations of Electrolyte Mixing in Vanadium Flow Batteries." Applied Energy 204 (2017): 373-381.; Document 2: Luo, Qingtao et al. "Capacity Decay and Remediation of Nafion-Based All-Vanadium Redox Flow Batteries." (2013): 268-274.) They are basically different from the direct restoration through electrolysis in that their purpose is for extending but not for restoring and activating the life of the electrolyte of the original system.

In view of the foregoing problems, like-minded patents have been disclosed so far, whose principles are mostly to process adjustment by adding reductant, reduction by electrifying, and the likes through methods of connecting to external device, using built-in reduction device, or sacrificing a part of electrolyte, etc. for adjusting the valence of the electrolyte of the system. However, these methods revealed in the documents generally accompany with adding extra additives, where the additives not fully reacted may cause contamination to electrolyte or cell stack with performance degradation or longer processing time. If a non-approximate electrolyte substance or non-V metal ion is used in electrolysis, it could lead to a dramatic change in osmotic pressure. The problems of diluted concentration with volume increase or contamination with ion diffusion would have serious effects on the system and are not easily solved. Hence, the prior arts do not fulfill all users' requests on actual use.

SUMMARY OF THE INVENTION

The main purpose of the present invention is to solve the problem of that, after a long term of use, V electrolyte would naturally have a side reaction of generating hydrogen with valence increased and capacity lost permanently as incapable of restoring valence through self restoration, where the V electrolyte which occupies the largest proportion of the construction cost of an all-VRFB achieves sustainable use.

Another purpose of the present invention is to use the data of the electrolyte of an original system obtained through analysis to be coordinated with a V electrolyte and a reducing agent additionally equipped at a reusable positive electrode for forming a VRFB stack as an electrolysis device, where, after a long-term reaction, a high-valence (greater than 3.5) electrolyte at the positive electrode of the all-VRFB is directed out at the negative electrode of the electrolysis device with electrolysis processed after accurate calculations; and, in the end, the internal fluid balancing method of the original system is combined for achieving harmless and fast valence restoration to the electrolyte of the original system as a final resort for the restoration of V electrolyte.

Another purpose of the present invention is to use the concept of electrolysis with separation accompanied for not using any chemical reducing agent to the original system or causing other possible interference, like leaving residues, on the performance of electrolyte, where, furthermore, general problems related to the electrolysis method are solved for the natural characteristics of osmotic pressure variation and ion diffusion which result in uneven concentration or electrolyte pollution.

Another purpose of the present invention is to provide a commercial application in an external or built-in form as a concept to form an external restoration device for repetitively conducting small-scale commercial treatment to a system, or by using a built-in device, to achieve the restoration of valence and capacity of the energy storage system.

To achieve the above purposes, the present invention is a method of restoring an electrolyte of VRFB through electrolysis, comprising steps of (a) analysis, (b) electrolytic calculation, (c) electrolysis, and (d) mixture restoration, where step (a) comprises the following steps: (a1) after examining an original system of VRFB in real time, a level difference between an electrolyte at a positive and a negative electrodes is obtained and volumes of the electrolyte at the positive and the negative electrodes along with a volume of a residual solution of an electrolysis device are figured out; (a2) electrolyte traces are sampled from the electrolyte at the positive and the negative electrodes of the original system; and (a3) the concentrations and valences of V ion in the electrolyte at the positive and the negative electrodes are directly quantitated through potentiometric titration to obtain the parameters of the original system, including the volumes, the concentrations, and the valences of the electrolyte at the positive and the negative electrodes; where step (b) processes an actuarial calculation to obtain a required electricity amount for restoring the electrolyte of the original system to a total valence of 3.5, comprising the following steps: (b1) based on the volumes, the concentrations, and the valences of the electrolyte at the positive and the negative electrodes of the original system, a total volume and a total valence of the electrolyte of the original system are calculated; (b2) an electricity amount (ampere hour, Ah) awaited for electrolysis (ELFE) and a required amount of a reducing agent are figured out accordingly; and, (b3) at last, the volume of the residual solution is introduced to calculate a predicted valence and a predicted concentration before electrolysis; where step (c) comprises the following steps: (c) after processing sampling and calculating in step (a) and step (b), the electrolyte at the positive electrode of the original system is connected with a negative electrode of the electrolysis device; (c2) the reducing agent is added into the electrolyte at a positive electrode of the electrolysis device and a liquid-supplying device runs to cycle solution between positive and negative electrodes; (c3) parameters including the ELFE, a charging current, and an upper limit of voltage are set to the electrolysis device to charge the electricity amount awaited to the negative electrode in effect and the parameters are set according to the operating methods and limits of the type of the electrolysis device; and, (c4) after electrolysis is finished, the electrolyte at the negative electrode of the electrolysis device is directed to a tank at the positive electrode of the original system; and where, after processing step (b) and step (c), through a process of: (d1) self-adjusting mixture restoration with a native electrolyte balance mechanism of the VRFB; (d2) system restoration with efficiency and capacity optimized through calculation of discharge equivalent for balancing; or (d3) complete mixture of the electrolyte at the positive and the negative electrodes before being further divided into two equal volumes, the original system of VRFB restores the original state of the electrolyte. Accordingly, a novel method of restoring an electrolyte of VRFB through electrolysis is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
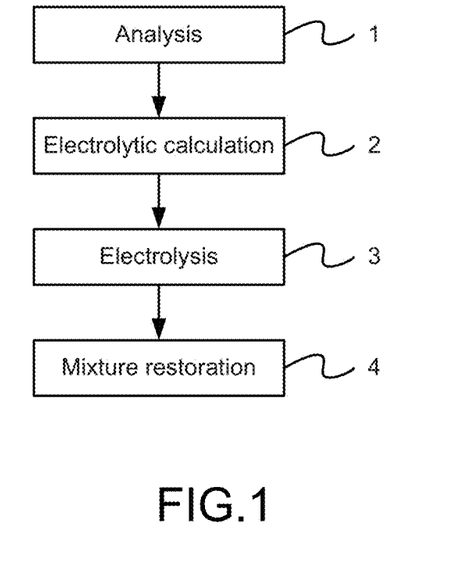
FIG. 1 is the flow view showing the preferred embodiment according to the present invention.
Figure 2:
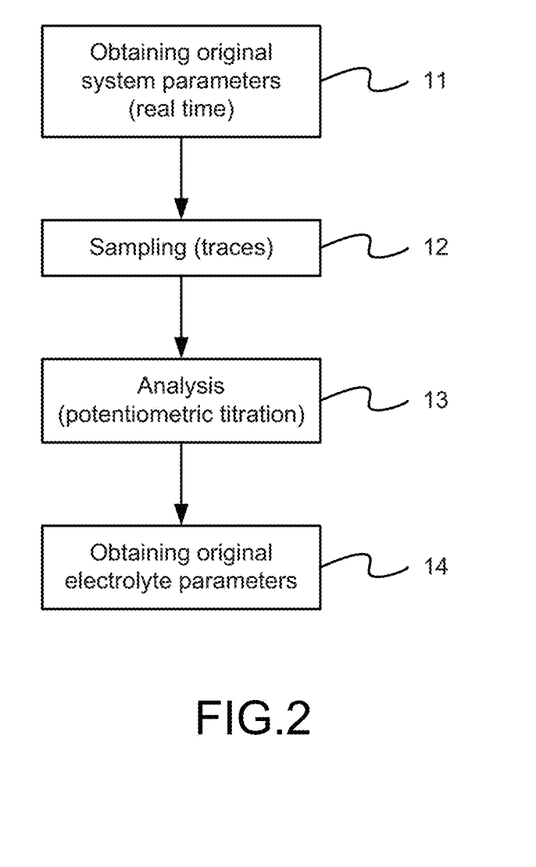
FIG. 2 is the flow view showing the step of analysis.

Please refer to FIG. 1 to FIG. 7, which are a flow view showing a preferred embodiment according to the present invention; flow views showing steps of analysis, electrolytic calculation, electrolysis, and mixture restoration; and views showing results of a first and a second states-of-use. As shown in the figures, the present invention is a method of restoring an electrolyte of vanadium (V) flow battery (VRFB) through electrolysis, which only suits a flow battery having the same electrolyte at the positive and negative electrodes, like VRFB. On using, the present invention comprises steps of analysis, electrolytic calculation, electrolysis, and mixture restoration, which steps refer to FIG. 2 to FIG. 5 as follows:

(a) Analysis [1]: (a1) By examining an original system of VRFB in real time, a level difference of an electrolyte between a positive and a negative electrodes is obtained; and volumes of the electrolyte at the positive and the negative electrodes and a volume of a residual solution of an electrolysis device are figured out [11]. (a2) Electrolyte traces of 0.4-0.6 milli-liters (ml) are sampled from the electrolyte at the positive and the negative electrodes of the original system [12]. (a3) The concentrations and valences of V ion in the electrolyte at the positive and the negative electrodes are directly quantitated through potentiometric titration [13]. Thus, parameters of the original system, including volumes, concentrations, and valences of the electrolyte at the positive and the negative electrodes are obtained [14].

Figure 3:
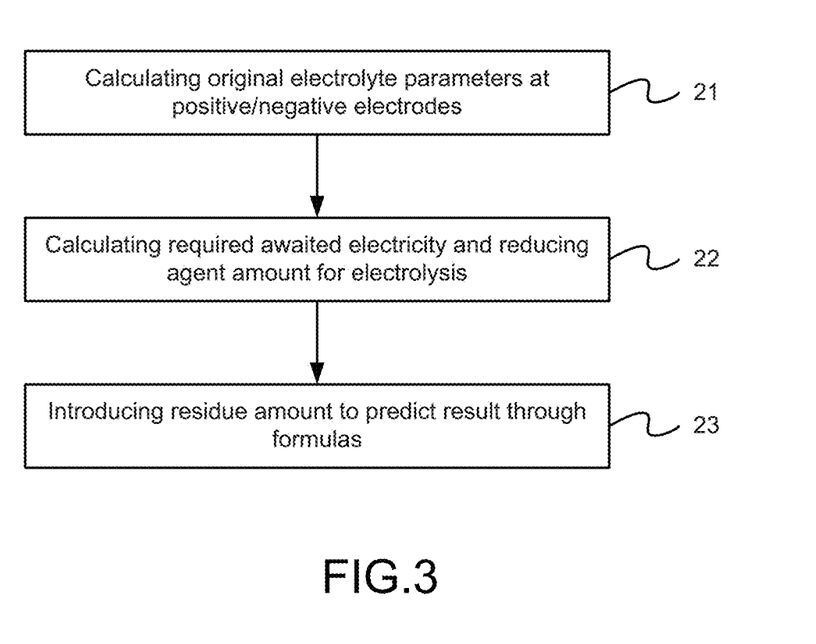
FIG. 3 is the flow view showing the step of electrolytic calculation.

(b) Electrolytic calculation [2]: The present invention uses an actuarial calculation to obtain a required electricity amount for restoring the original system to obtain a total valence of 3.5, so that precise reduction could be achieved through electrolysis as follows. Therein, (b1) with formulas based on the volumes, the concentrations, and the valences of the electrolyte at the positive and the negative electrodes of the original system, a total volume and a total valence of the electrolyte of the original system are calculated [21]; (b2) with formulas, an ELFE and a required amount of a reducing agent are figured out [22]; and, (b3) with formulas, the volume of the residual solution is introduced to calculate a valence and a concentration predicted before electrolysis. [23]

The followings are the formulas used in step (b):

Formulas for Step (b1):

(Total solution volume $A$,TSV-$A$)–(electrolyte volume at positive electrode,EVOPE)+(Electrolyte volume at negative electrode,EVNE)

(Total electrolyte concentration($M$) of original system,TECOS)–[(Electrolyte concentration at positive electrode,ECPE)*EVOPE+(Electrolyte concentration at negative electrode,ECNE)*EVNE]/TSV-$A$ (Total electrolyte valence of original system,TEVOS)–[ECPE*EVOPE*(Electrolyte valence at positive electrode,EVAPE)+ECNE*EVNE*(Electrolyte valence at negative electrode,EVANE)]/TSV-$A$/TECOS Formulas for Step (b2):

[Electricity amount(ampere hour,Ah)awaited for electrolysis,ELFE]–TECOS*(TEVOS–3.5)*TSV-$A$*(Faraday's constant)/3600

(Required amount of reducing agent,RARA)–[ELFE*3600/(Faraday's constant)]*(Molecular weight of reducing agent,MWRA)

Formulas for Step (b3):

(Total solution volume $B$,TSV-$B$)–(Volume of residual solution,VRS)+(Electrolyte volume at positive electrode of original system,EVOPOS)

Figure 4:
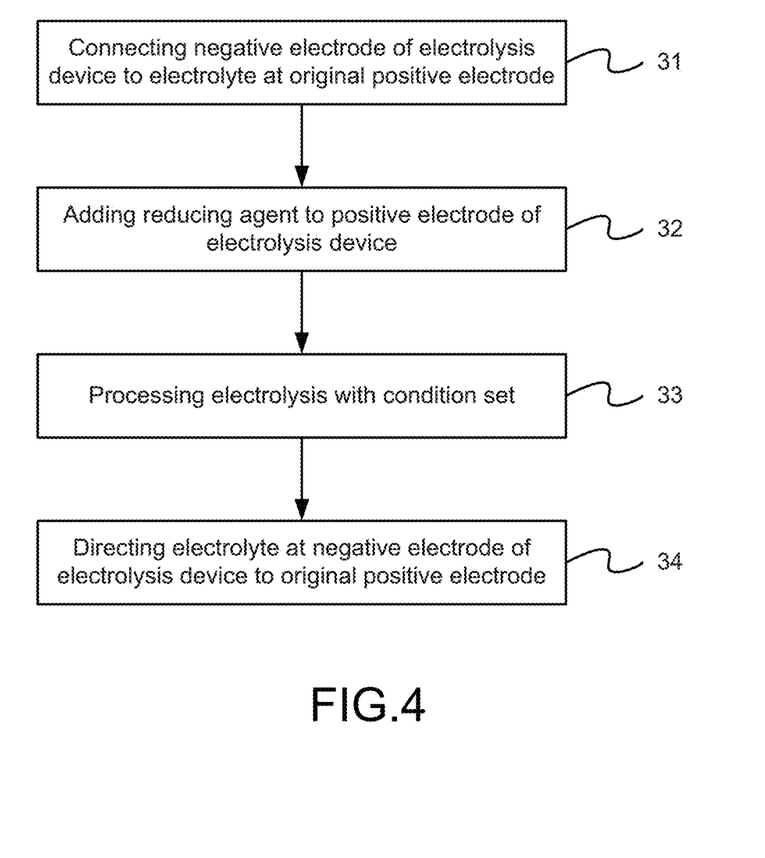
FIG. 4 is the flow view showing the step of electrolysis.

(Concentration of mixed residual solution,CMRS)–[(Concentration of residual solution,CRS)*VRS+(Electrolyte concentration at positive electrode of original system,ECPOS)*EVOPOS]/TSV-$B$ (Valence of mixed residual solution,VMRS)–[CRS*VRS*(Valence of residual solution,VRS)+ECPOS*EVOPOS*(Electrolyte valence at positive electrode of original system,EVAPOS)]/TSV-$B$/CMRS (Concentration after electrolysis,CAE)–VMRS (Valence after electrolysis,VAE)–[CMRS*VMRS*(VRS+EVOPOS)–ELFE*3600/(Faraday's constant)]/TSV-$B$/CAE (c) Electrolysis [3]: (c1) After processing step (a) and step (b), a negative electrode of the electrolysis device is connected to the electrolyte at the positive electrode of the original system [31]. (c2) The reducing agent is added into the electrolyte at the positive electrode of the electrolysis device and a liquid-supplying device runs to cycle solution between positive and negative electrodes [32]. (c3) Parameters including the ELFE, a charging current, and an upper limit of voltage are set to the electrolysis device to charge the electricity amount awaited to the negative electrode in effect; and the parameters are set according to the operating method and limits of the type of the electrolysis device [33]. (c4) At last, after the electrolysis is finished, the electrolyte at the negative electrode of the electrolysis device is directed to a tank of the positive electrode of the original system [34].

On processing step (c2), gas generation is a natural reaction at the positive electrode, where environmental ventilation should be maintained to successfully escape carbon dioxide and other by-products for increasing reaction efficiency and eliminating the risk of choking in a confined space.

Besides, what should be noted is that, for the electrolysis device used in step (c), a non-selective porous membrane is not suitable to be used as a separator between the positive and the negative electrodes. The reducing agent should be avoided from easily passing from the positive electrode to the negative electrode through the separator. Otherwise, the performance of the original system would be further affected after restoration.

Figure 5:
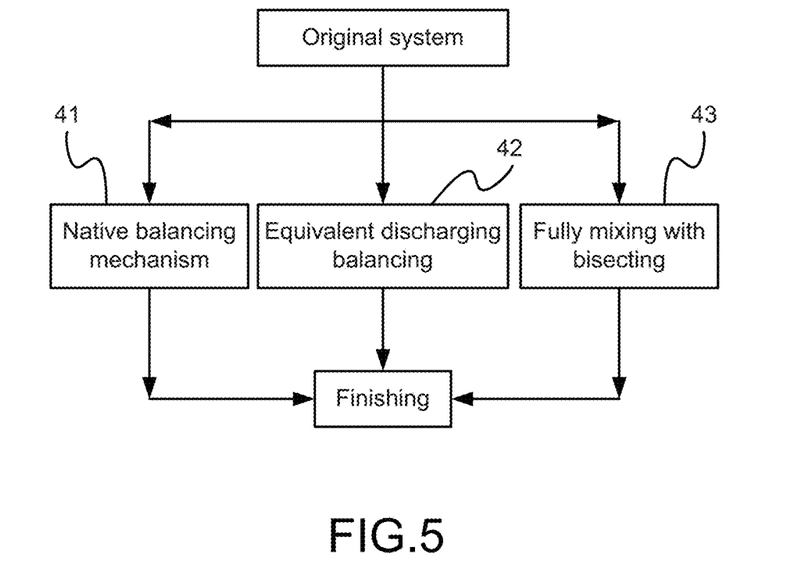
FIG. 5 is the flow view showing the step of mixture restoration.

(d) Mixture restoration [4]: (d1) After processing step (b) and step (c), through a process of: (d1) self-adjusting mixture restoration with a native electrolyte balance mechanism of VRFB [41]; (d2) system restoration with efficiency and capacity optimized through calculation of discharge equivalent for balancing [42]; or (d3) complete mixture of the electrolyte at the positive and the negative electrodes before being further divided into two equal volumes [43], the original system of VRFB restores the original state of the electrolyte. Therein, regardless of using which kind of the process mentioned above, mixing should be processed after dealing with valence for generating the effect of restoration; otherwise, benefit would not be obvious. Thus, a novel method of restoring an electrolyte of VRFB through electrolysis is obtained.

The above four steps, except step (a), have the potential to be automated for VRFB. However, owing to the limit in hardware design nowadays, staging operations are still needed for ensuring feasibility.

After the restoration of the original system of VRFB is finished, the appearance and measured physical properties are not significantly changed; yet, the concentration and valence of V ion in the V electrolyte are balanced again because of the operation in step (d). Hence, after the restoration is finished, the first few cycles of charging and discharging will achieve an activation effect. Therein, the capacity and the performance of the first cycle will be slightly low, but the following cycles of charging and discharging will restore a highest capacity of 95 percent (%) before the restoration and the velocity of capacity decay after the cycles of charging and discharging is significantly reduced.

A state-of-use mentioned below is operated with a VRFB having a reaction area of 25 square centimeters ($cm^2$) under an operating condition of 160 milli-Ampere per square centimeter ($mAcm^{-2}$) while using a membrane of DuPont's Nafion N212. After an initial 100 cycles pf charging and discharging, a total valence at positive and negative electrodes is increased to 3.55 with the calculation of concentration and valence. The total valence is decreased to 3.50 after electrolysis. After backfilling to the positive electrode of the battery together with the calculation of discharge equivalent for balancing in step (d2), a certain amount of the electrolyte is obtained at the positive electrode to be mixed with that at the negative electrode for testing through charging and discharging. As a result shows, the energy efficiency is slightly increased for about 1-3% as compared to that before restoration; the average capacity declination per cycle is 70%; and the capacity is even restored to its original state. The result shows great effect.

For applying the restoration of capacity into full effectiveness, the mixture restoration of step (d) is required; or else, the effect ends with the production of V electrolyte having a reduced valence only. In addition, a blind mixture of V electrolyte without calculation might result in great declination of capacity for the performance of the original system, which might even cause an unusable state as greatly affecting the performance of the original system. Hence, a method designed for adjusting electrolyte is required. It can be, as stated in step (d1), a process of a native electrolyte balance mechanism of the original system; as stated in step (d2), a process of calculation of discharge equivalent for balancing; or as stated in step (d3), a process of bisecting after complete mixture, which suits an electrolyte having severe V concentration imbalance for better balancing ion concentrations at positive and negative electrodes during system restoration.

For applying the present invention to a VRFB, an idle time of the battery stack is recommended. For an online application, the charging-and-discharging capacity of current cycle needs to be slightly sacrificed during system restoration.

The following states-of-use are operated with a single cell of VRFB.

[State-of-use 1] Asymmetric Mixture Treatment (The native balancing mechanism in step (d1) is a well-known technology of discharging equivalent for balancing stated in step (d2)):

Result Obtained after Mixing in Step (d2):

This state-of-use has an original system comprising a single cell of VRFB with a cation exchange membrane of Nafion N212; and 80 ml of 3.5-valence V electrolyte at both of the positive and the negative electrodes both. After running 100 cycles at a current density of 160 $mAcm^{-2}$, the maximum capacity declines from an original 2.33 Ampere hours (Ah) to 1.43 Ah, about 60% left. The volumes, concentrations, and valences of an electrolyte at the positive and negative electrodes are not balanced. The electrolyte at the positive electrode has extra 4 ml. After the analysis in step (a) and the electrolytic calculation in step (b), a mixture valence is 3.55 in the meantime.

Figure 6:
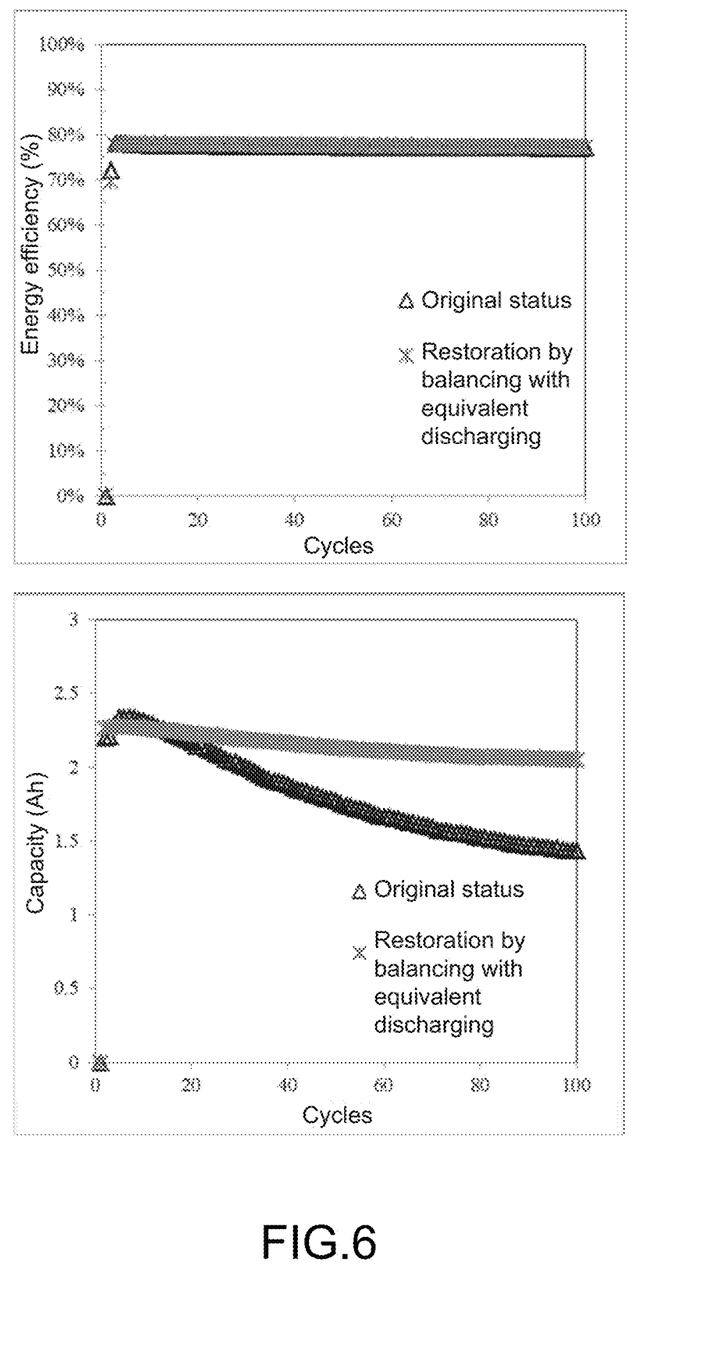
FIG. 6 is the view showing the result of the first state-of-use.

After the calculation, in step (c), another single cell of a system different from the original system is used as an electrolysis device. The electrolyte at the positive electrode is an 80 ml recycled 4-valence V electrolyte and is mixed with 0.848 grams (g) of oxalic acid dihydrate added through actuarial calculation (slight mixture). After the electrolyte at the positive electrode of the above to-be-restored system is connected with a negative electrode of the electrolysis device, charging is processed with a constant electricity of 0.36 Ah. After the charging is finished, the product at the negative electrode is completely returned back to the positive electrode of the original system. After the calculation in step (d2), 17.5 ml of the electrolyte at the positive electrode is obtained to be added into the tank at negative electrode for uniform mixture. A test of charging-and-discharging cycles is processed again. As a result, the capacity is restored to 2.26 (close to the maximum value of 2.314 for the original system) and declination is significantly slowed down for successfully completing system restoration as shown in FIG. 6.

Result Obtained after Fully Mixing Followed with Bisecting in Step (d3):

This state-of-use has an original system comprising a single cell of VRFB with a cation exchange membrane of Nafion N212; and 80 ml of 3.5-valence V electrolyte at both of the positive and the negative electrodes. The battery system is operated under a current density of 160 $mAcm^{-2}$; and, in halfway, the restoration with self-adjustment is processed according to the present invention. After operating a total of about 500 cycles, the capacity is declined from the maximum to about 86% left. The volumes, concentrations and valences of the electrolyte at the positive and negative electrodes are not balanced, where the electrolyte at the negative electrode has more volume for 17 ml than the electrolyte at the positive electrode. After the analysis in step (a) and the electrolytic calculation in step (b), a process of complete mixing obtains a total valence of 3.61 and a total concentration a little lower than the original status, which drops from 1.68 molars (M) to 1.65 M (maybe owing to deposition at the positive electrode).

Figure 7:
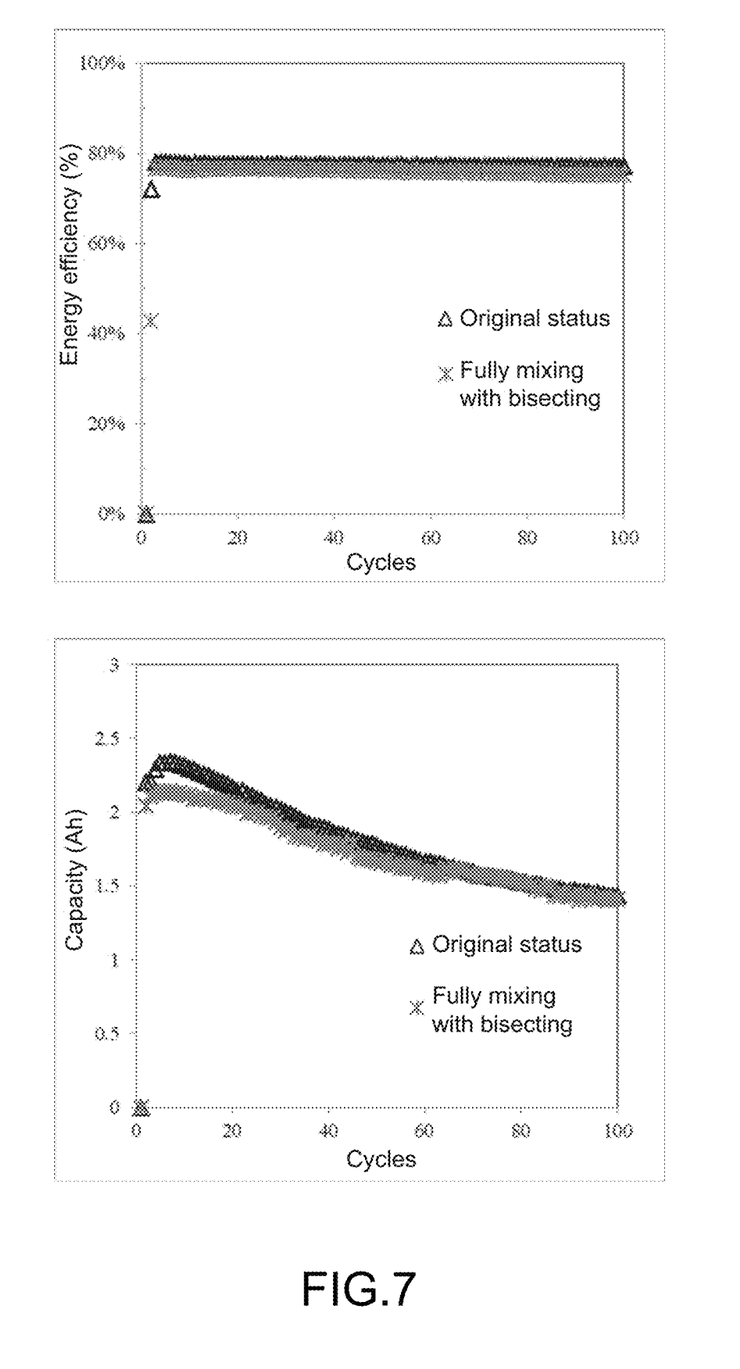
FIG. 7 is the view showing the result of the second state-of-use.

In this state-of-use, after finishing the analysis in step (a) and the electrolytic calculation in step (b), another single cell different from the original system is used as an electrolysis device in step (c). The electrolyte at the positive electrode is a recycled V electrolyte and is mixed with 1.907 g of oxalic acid dihydrate added through actuarial calculation (slight mixture). In addition, after the electrolyte at the positive electrode of the original system is connected with a negative electrode of the electrolysis device, charging is processed with a constant electricity of 0.81 Ah. After the charging is finished, the product at the negative electrode is completely returned back to the positive electrode of the original system. In step (d3), the electrolyte at the positive and the negative electrodes are completely mixed and, then, bisected to be returned back to the tanks at the positive and the negative electrodes, separately. After pumping the residual solution for a while for mixing, the processes of mixing and bisecting is operated again. The total valence of the electrolyte of the original system is obtained through calculation, which is restored to 3.50 after the electrolysis. A test of charging-and-discharging cycles is processed again to complete the restoration of electrolyte for the original system. In this state-of-use, the process of charging and discharging obtains a result diagram similar to the original diagram. The electrolyte characteristics are similar to an original rollout electrolyte but a slight loss still happens, which, however, still work good as shown in FIG. 7.

[State-of-use 2] Used and Discarded High-Valence V Electrolyte Restored to 3.5-Valence:

This state-of-use uses a single cell as an electrolysis device; and 80 ml of a used high-valence V electrolyte (4.0 valence, 1.83 M), which is unrecyclable through any non-restoration method, is obtained to be deposed at a negative electrode of the electrolysis device. After an actuarial calculation, 4.291 g of oxalic acid dihydrate is added in advance to an electrolyte at a positive electrode of the electrolysis device whose cap is not closed. After opening an infusion device, an electricity amount of 2.03 Ah is charged with a constant current of 5 A (about 20-30 minutes spent).

After finishing electrolysis, the status of the electrolyte is analyzed, where a processed electrolyte having a valence of 3.50 and a concentration of 1.78 M is obtained with a concentration error of 2.7%. The volume obtained after the electrolysis remains 80 ml. As compared to the electrolysis method using sulfuric acid at the positive electrode with volume substantially increased (about 20-50%) after electrolysis and concentration significantly reduced (as reduced to 1.2-1.4 M) owing to dilution, great improvement is achieved.

The present invention is used with a system of VRFB during idle time, periodical time, or when the capacity is declined at a certain amount. At first, a V electrolyte at positive and negative electrodes of an original system is obtained for quantitative analysis of concentrations and valences. After obtaining a level difference between the electrolyte at the positive and the negative electrodes and figuring out volumes of the electrolyte at the positive and the negative electrodes, a required amount of electricity for charging the electrolyte is calculated out with formulas developed by the present invention. Then, the V electrolyte at the positive electrode of the original system is connected to a negative electrode of an electrolysis device for processing electrolysis with the required amount of electricity. After finishing the electrolysis, the charged electrolyte is filled back to the tank of the original system. Through a built-in mechanism of liquid-level balance in the original system, the life of the electrolyte of the original system is restored after mixing. Hence, the present invention has the following feature:

1. The present invention selects the V electrolyte in the original system to be used at a positive electrode of an electrolysis device. Then, for each restoration, an equivalent amount of a reducing agent (oxalic acid) figured out through calculation is added in advance as an electrolyte at the positive electrode of the electrolysis device. Since the concentration is close to that of the to-be-restored electrolyte, possible encountered issues of volume, osmotic pressure, and control during traditional electrolysis restoration are resolved.

(If a non-V electrolyte is used at the positive electrode, the concentration of the product at the negative electrode will greatly drop and the concentration of V ion is decreased or the contamination by positive ions of the electrolyte may happen, which all have a negative impact on the original system.)

2. In the present invention, the reducing agent dedicated to the V electrolyte at the positive electrode of the electrolysis device is chosen from oxalic acid or methanol. After reaction, harmless carbon dioxide is generated. The condition of high temperature required for reaction is obtained from the natural heat dissipation generated during electrolysis of the battery stack for heating temperature up without extra heat required for accelerating the reaction. The operation becomes easy.

3. After reaction, a few of the electrolyte at the positive electrode mixed with the reducing agent is left. Even without heating, after being idled for about a day, the electrolyte will automatically completely reacted with extra 5-valence material after the electrolysis. Consequently, the positive V electrolyte of the electrolysis device is obtained with features which include: 4 valence stayed after the reaction eventually; mild reaction; gas not produced severely; and the reducing agent supplemented during a prior, midterm, and/or final stage, if needed be, without downtime for completing the reaction. As compared to traditional methods like using a severe reducing agent of hydrazine compound, stopping the system as a requirement for restoration, or using a mild reagent like ethanol and oxalic acid with a reaction temperature set to be above 80 Celsius degrees, advantages are obtained including non-toxicity, high security, sustainable use, easy maintenance and easy operation.

4. The present invention deals with the electrolyte at the positive electrode of the original system only, but not the negative electrode which is sensitive and may be easily oxidized. The impact to the original system is minimized and the operating voltage is lowered as well for maintaining the life of the electrolysis device.

5. For application, the present invention assembles a stack of commercially available conventional flow battery. On using, the voltage is low for achieving the benefit of low power consumption and few material loss. Or, the assembly may comprise a design of electrolysis bath for high degree of freedom.

6. The present invention provides calculation methods for building programs or units of automatic calculations. Necessary conditions (e.g. concentration, valence, etc.) obtained through analysis of measurement and sampling are inputted to be combined with volume parameters for automatically calculating treating conditions and mixing conditions. Thus, automation in operation is made possible.

7. The present invention focuses on a valence-unbalanced flow battery system for a short-term operation scenario of restoration only once with a good result obtained. Yet, for processing a long-term electrochemical reaction like producing electrolyte, the to-be-processed electrolyte (i.e. products) may have batch-quality problems like inconsistencies in concentrations and valences.

As is described above, the present invention is different from the prior arts in that: the reducing agent does not contact the to-be-treated electrolyte; the concept of electrolysis accompanied with separation is used so that the original system dos not need to be disassembled or separate a part of components for completing valence restoration; during reaction, the positive electrode is added with a mild reducing agent in advance so that the potential change is stable for operation without downtime treatment; no toxic substance is used and no unusable by-product is generated; and sophisticated theories of calculations are used for engineering controls of inter-mixing to carry out the purpose of restoring the valence and capacity of a flow battery. Therefore, economical, fast, and environmental principles are conformed.

As compared to related patents, regarding the purposes, similar designs related to restoring the valence of a system are not found. Only similar concepts in theories are disclosed. Their purposes are to manufacture a certain number of V electrolytes having particular valences with flows and embodiments unsuitable for the use condition of the present invention; hence, are valid to their specific purposes, not applicable to the present invention directly. Besides, the purpose of the present invention focuses on the theoretical design for restoration equipment with mobility, which is a new application but no similar feasible electrolysis method is found. Thus, the present invention provides a novel design innovation in line with the improvement factor for a patent.

The purpose of the present invention is critical to the industrialization of VRFB, which truly makes the high-cost electrolyte of flow battery sustainable for a very long time. With the coordination of the balancing mechanism of the commercialized system itself for life extension, the flowcell can be an ultra-reliable energy storage. Not only it saves the cost regarding the purchase of a lot of new electrolyte needed or the maintenance regarding recycling old electrolyte for re-producing, but also it serves different V flow batteries. The application field is very large, opportunities are huge, and good industrial applicability is achieved.

To sum up, the present invention is a method of restoring an electrolyte of VRFB through electrolysis, where a method is provided for restoring the valence of V electrolyte through electrolysis; the life of VRFB is restored; and service mobility is further provided for multiple battery systems.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of restoring an electrolyte of vanadium (V) redox flow battery (VRFB) through electrolysis, comprising steps of:
    (a) analysis,
        wherein, (a1) after examining an original system of VRFB in real time, a level difference between an electrolyte at a positive electrode and that at a negative electrode is obtained and volumes of said electrolyte at said positive and said negative electrodes along with a volume of a residual solution of an electrolysis device are figured out;
        (a2) electrolyte traces are sampled from said electrolyte at said positive and said negative electrodes of said original system; and
        (a3) the concentrations and valences of V ion in said electrolyte at said positive and said negative electrodes are directly quantitated through potentiometric titration to obtain the parameters of said original system, including said volumes, said concentrations, and said valences of said electrolyte at said positive and said negative electrodes;
    (b) electrolytic calculation,
        wherein an actuarial calculation is processed to obtain a required electricity amount to restore said electrolyte of said original system to a total valence of 3.5;
        wherein, (b1) based on said volumes, said concentrations, and said valences of said electrolyte at said positive and said negative electrodes of said original system, a total volume and a total valence of said electrolyte of said original system are calculated;
        (b2) an electricity amount (ampere hour, Ah) awaited for electrolysis (ELFE) and a required amount of a reducing agent are figured out accordingly; and,
        (b3) at last, said volume of said residual solution is introduced to calculate a predicted valence and a predicted concentration before electrolysis;
    (c) electrolysis,
        wherein, (c1) after processing sampling and calculating in step (a) and step (b), said electrolyte at said positive electrode of said original system is connected with a negative electrode of said electrolysis device;
        (c2) said reducing agent is added into said electrolyte at a positive electrode of said electrolysis device and a liquid-supplying device runs to cycle solution between positive and negative electrodes;
        (c3) parameters including said ELFE, a charging current, and an upper limit of voltage are set to said electrolysis device to charge said electricity amount awaited to said negative electrode in effect and said parameters are set according to the operating methods and limits of the type of said electrolysis device; and,
        (c4) after electrolysis is finished, said electrolyte at said negative electrode of said electrolysis device is directed to a tank at said positive electrode of said original system; and
    (d) mixture restoration,
        wherein, after processing step (b) and step (c), through a process selected from a group consisting of: (d1) a process of self-adjusting mixture restoration with a native electrolyte balance mechanism of VRFB; (d2) a process of system restoration with efficiency and capacity optimized through calculation of discharge equivalent for balancing; and (d3) a process of complete mixture of said electrolyte at said positive and said negative electrodes before being further divided into two equal volumes, said original system of VRFB restores the original state of said electrolyte.

2. The method according to claim 1,
wherein, in step (a), 0.4-0.6 milli-liters of said electrolyte traces are sampled from said electrolyte at said positive and said negative electrodes of said original system.

3. The method according to claim 1,
wherein, in step (b), said total volume and said total valence of said electrolyte of said original system are obtained with the following formulas:

(total solution volume $A$,TSV-$A$)=(electrolyte volume at positive electrode,EVOPE)+(electrolyte volume at negative electrode,EVNE);

(total electrolyte concentration($M$) of original system,TECOS)−[(electrolyte concentration at positive electrode,ECPE)*EVOPE+(electrolyte concentration at negative electrode,ECNE)*EVNE]/TSV-$A$; and (total electrolyte valence of original system,TEVOS)−[ECPE*EVOPE*(electrolyte valence at positive electrode,EVAPE)+ECNE*EVNE*(electrolyte valence at negative electrode,EVANE)]/TSV-$A$/TECOS.

4. The method according to claim 1,
wherein, in step (b), said ELFE and said required amount of said reducing agent are obtained with the following formulas:

ELFE−TECOS*(TEVOS−3.5)*TSV-$A$*(Faraday's constant)/3600; and (required amount of reducing agent,RARA)−[ELFE*3600/(Faraday's constant)]*(molecular weight of reducing agent,MWRA).

5. The method according to claim 1,
wherein, in step (b), said valences and said concentrations predicted before electrolysis are obtained with the following formulas:

(total solution volume $B$,TSV-$B$)−(volume of residual solution,VRS)+(electrolyte volume at positive electrode of original system,EVOPOS);

(concentration of mixed residual solution,CMRS)−[(concentration of residual solution,CRS)*VRS+(electrolyte concentration at positive electrode of original system,ECPOS)*EVOPOS]/TSV-$B$;

(valence of mixed residual solution,VMRS)−[CRS*VRS*(valence of residual solution,VRS)+ECPOS*EVOPOS*(electrolyte valence at positive electrode of original system,EVAPOS)]/TSV-$B$/CMRS;

(concentration after electrolysis,CAE)−VMRS; and
(valence after electrolysis,VAE)−[CMRS*VMRS*(VRS+EVOPOS)−ELFE*3600/(Faraday's constant)]/TSV-$B$/CAE.

6. The method according to claim 1,
wherein, in step (c), said electrolysis device obtains a membrane with selectivity to be a separator between said positive and said negative electrodes.

7. The method according to claim 1,
wherein, in step (d), said process operates mixing after valence is completely treated.

8. The method according to claim 1,
wherein said original system of VRFB obtained after finishing restoration processes a plurality of cycles of charging and discharging after a first cycle thereof to restore 95 percent of a highest electric capacity before restoration.

* * * * *